July 25, 1933.  C. W. LITTLER  1,919,637
TUBE MANUFACTURE
Filed Sept. 23, 1930  2 Sheets-Sheet 1
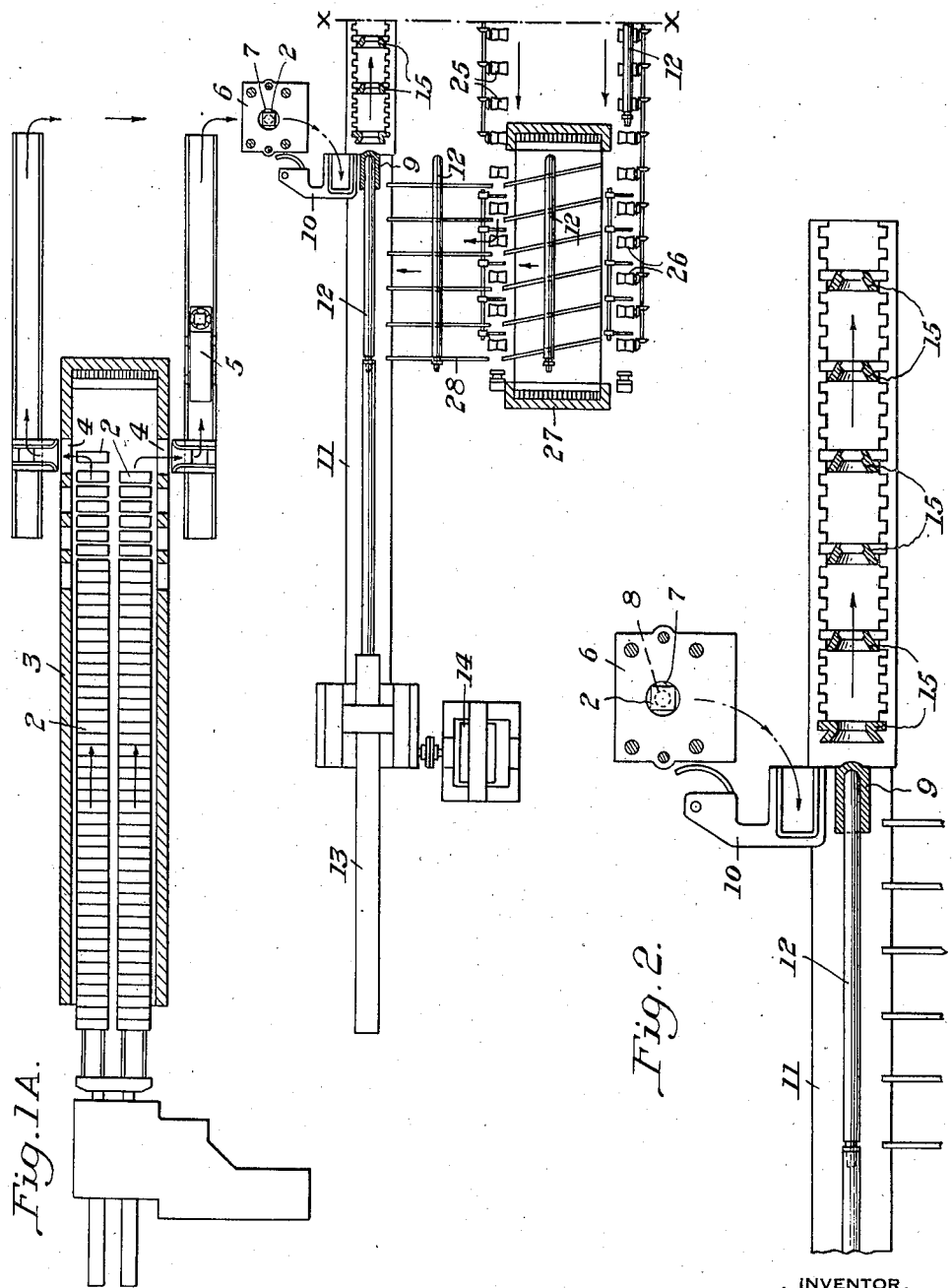

July 25, 1933.  C. W. LITTLER  1,919,637
TUBE MANUFACTURE
Filed Sept. 23, 1930  2 Sheets-Sheet 2

INVENTOR
Carl W. Littler
By Byrnes, Stebbins,
Parmelee & Blenko
Attorneys

Patented July 25, 1933

1,919,637

UNITED STATES PATENT OFFICE

CARL W. LITTLER, OF ALIQUIPPA, PENNSYLVANIA, ASSIGNOR TO JONES & LAUGHLIN STEEL CORPORATION, OF PITTSBURGH, PENNSYLVANIA, A CORPORATION OF PENNSYLVANIA

TUBE MANUFACTURE

Application filed September 23, 1930. Serial No. 483,777.

This invention relates to tube manufacture, and more particularly to a new method and apparatus for manufacturing seamless tubing.

By my invention I provide a method and apparatus for the manufacture of seamless tubing which permits the use of a lower grade of material than that heretofore used in the manufacture of seamless tubing without lowering the quality of the finished tubing. My invention also provides a method and apparatus for the manufacture of tubing which materially reduces the original cost of installing tube manufacturing apparatus and the cost of operation after installation.

Advantages inherent in my invention will be apparent to those skilled in the art from the following description thereof.

In the accompanying drawings in which I have shown a preferred embodiment of my invention, Figure 1A is a diagrammatic plan view partly in section of part of the apparatus which I provide;

Figure 2 is a plan view partly in section of the hydraulic press and the push bench which I provide;

Figures 1B, 3:
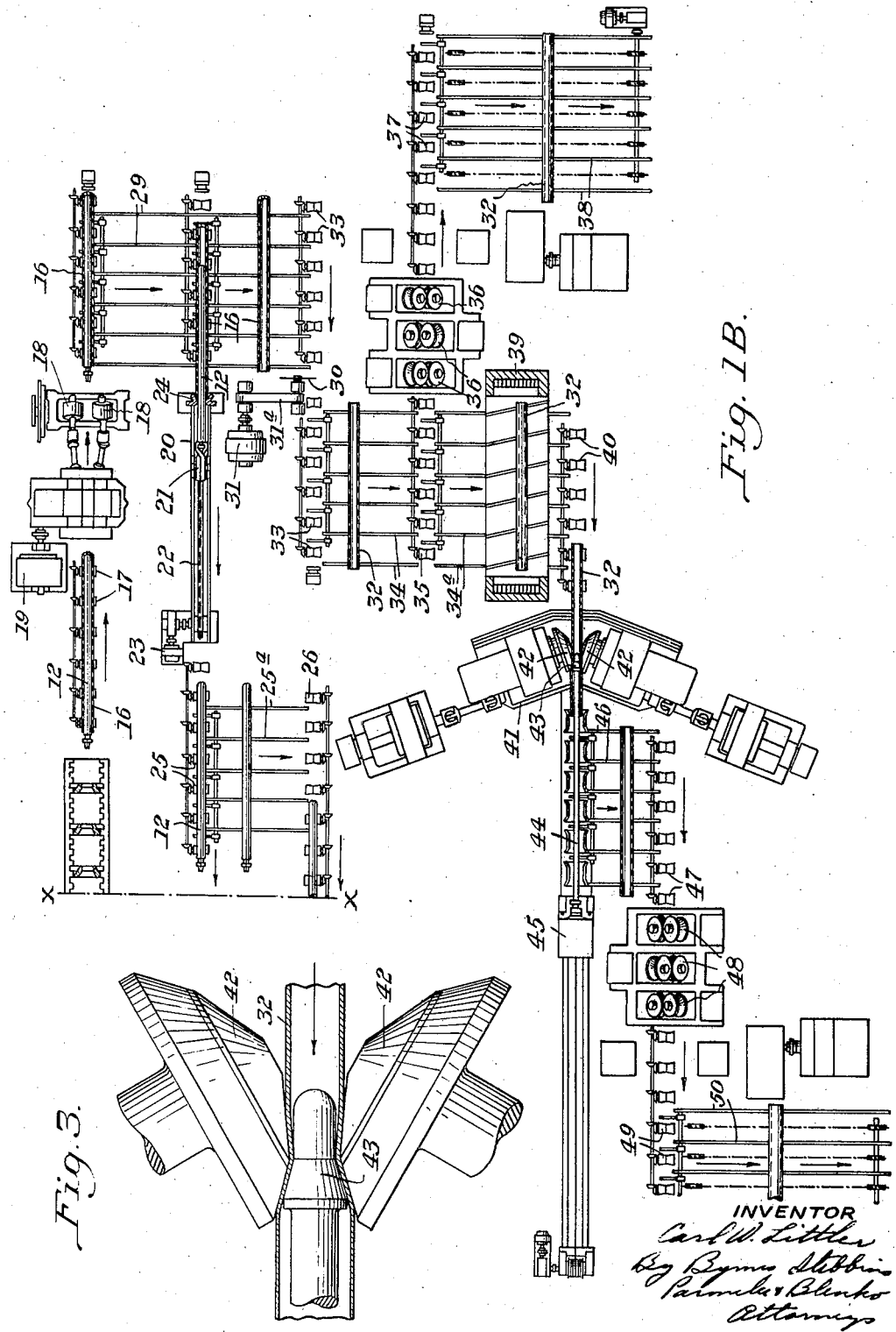
Figure 1B is a diagrammatic plan view partly in section of part of the apparatus which I provide and which is not shown in Figure 1A, Figure 1A and 1B joining along the line X—X.
Figure 3 is a plan view of the expanding rolls and the mandrel in engagement with a tube, the tube being shown in section.

In the practice of my invention, square billets 2 are cut to proper length and placed in a continuous heating furnace 3 and uniformly heated. The billets are then removed from the furnace through openings 4 and placed on billet transfers 5 which serve to transport them to a vertical hydraulic press 6.

The square billet is placed in a round die 7 in the press 6. The round punch or plunger 8 of the press is forced vertically downwardly and caused to penetrate the axis of the billet. The displaced metal caused by the forcing of the punch or plunger downwardly along the axis of the billet fills the segmental areas of the die. This operation results in the formation of a heavy walled cylindrical shell or bottle 9 closed at one end.

The cylindrical shell or bottle 9 is then removed from the hydraulic press, placed on a transfer device 10 and transferred to the push bench 11. A long mandrel bar 12 is inserted in the bottle, bearing against the closed end. A rack 13 driven by a motor 14 is provided for moving the mandrel bar 12, with the bottle on the forward end thereof, along the push bench.

The bottle, closed end foremost, is pushed by the mandrel bar, which is in turn pushed by the rack 13, through a plurality of die rings 15 of decreasing diameter. This process serves to decrease the outside diameter of the bottle, and also the wall thickness. It results in an elongated closed end tubular shell or blank 16 having a wall thickness appreciably less than that of the bottle 9.

The tubular shell 16 with its mandrel bar 12 therein is transferred by means of driven transfer rolls 17 to a reeler 18 driven by a motor 19. The shell is passed through the reeler, which enlarges it and loosens it from the mandrel bar 12. The shell 16 and the bar 12 are then conveyed to a mandrel stripping bench. Tongs 21, pulled by a chain 22 and driven by a motor 23 and suitable gearing, engage the end of the mandrel bar 12 and remove it from the shell. The mandrel bar is pulled through a die 24, which rectifies its diameter and serves to engage the end of the shell 16 during the stripping operation.

The mandrel bar 12 may be then conveyed back by means of transfer rolls 25, skids 25a and rolls 26 to a heating furnace 27 which is provided for the purpose of heating the mandrel bar uniformly before it is inserted in the blank if such heating is deemed desirable. From the mandrel heating furnace 27 the mandrel bar is transferred by means of skids 28 to the push bench 11 ready for insertion in a new bottle. If heating of the mandrel bar is not desired, it is transferred by means of the transfer rolls 25 directly to the skids 28.

The shell, after the mandrel has been extracted therefrom, is transferred by means of skids 29 to a circular saw 30 driven by a motor 31 through a belt 31a, which saw is used for cutting off both ends of the shell.

The semi-finished tube 32 is then transferred by means of transfer rolls 33 and skids 34 and 34a to a reheating furnace 39 wherein any inequalities of temperature in the tubing are rectified. The tubing can be transferred around the furnace if heating is deemed not desirable.

The tube, after it is removed from the furnace, is transfered by means of transfer rolls 40 to an expanding mill. The expanding mill 41, shown in the drawings, is of the ordinary Stiefel type. In the expanding mill 41, the tubing 32 is engaged by the cross-rolls 42 and rotated helically over a conical plug 43, which is held against axial movement by a freely rotating mandrel bar 44 resting against a thrust bearing 45. In the expanding mill, the wall thickness of the tube is decreased and the outside and inside diameters increased.

The mandrel bar is removed from the tubing and the tubing transferred by means of skids 46 and transfer rolls 47 to a series of sizing rolls 48 which are used to bring the tubing to precisely the outside diameter required. The tubing is then transferred by means of transfer rolls 49 to a cooling bed 50 where it is allowed to cool. After cooling, the tubing is taken to be finished.

If the tubing, after passing through the die rings 15 and after having the closed end removed, is of the proper size, the tubing is transferred by means of transfer rolls 33, the skids 34, and transfer rolls 35 to sizing rolls 36. After passing through the sizing rolls, it is transferred by means of transfer rolls 37 to the cooling rack 38. After the tubes have been permitted to cool on the cooling rack, they are then passed through the finishing operations. Ordinarily, however, it is necessary to expand the tubing by passing it through the expanding mill 41.

As is well known to those skilled in the art, a very high grade of material is required in the manufacture of seamless tubing by the present methods. A high grade is necessary due to the enormous amount of work done on the material in the piercing operations. The method and apparatus which I provide for the manufacture of seamless tubing materially reduces the strain placed on the material. Consequently, a lower grade of material can be used and great savings effected. The method and apparatus which I provide for the manufacture of tubing materially reduces the original cost of installing tube manufacturing apparatus and the cost of operation after installation.

While I have described, for purposes of illustration only, a preferred embodiment of my invention, it is to be understood that it is not to be limited thereby but may be practiced or otherwise embodied within the scope of the appended claims.

I claim:

1. In the manufacture of tubing, the steps comprising pressing heated material into a bottle closed at one end, passing the bottle on a mandrel through a plurality of dies to thin and elongate the same into a blank, passing the mandrel and blank through a reeler to loosen the blank on the mandrel to facilitate stripping, stripping the blank from the mandrel, removing the closed end of the blank, and passing the blank through an expanding mill to expand the same.

2. In the manufacture of tubing, the steps comprising forming a relatively thick-walled bottle closed at one end, passing such bottle on a mandrel through a plurality of dies to thin and elongate the same into a blank, passing the mandrel and blank through a reeler to loosen the blank on the mandrel and slightly enlarge the same, stripping the blank from the mandrel, removing the closed end of the blank, reheating the blank, passing the blank through an expanding mill, and sizing the expanded blank.

3. Apparatus for the manufacture of tubing, comprising a press, a push bench including a mandrel and dies, a reeler for loosening a blank on a mandrel, a stripper for stripping the loosened blank from the mandrel, means for removing a closed end of the blank, and an expanding mill for expanding the blank.

4. Apparatus for the manufacture of tubing, comprising a press, a push bench including a mandrel and dies, a reeler for loosening a blank on a mandrel, a stripper for stripping the loosened blank from the mandrel, transfer means for transferring the stripped blank from the reeler, means associated with said transfer means for removing a closed end of the blank, and an expanding mill for expanding the blank.

5. Apparatus for the manufacture of tubing, comprising a press, a push bench including a mandrel and dies, a reeler for loosening a blank on a mandrel, a stripper for stripping the loosened blank from the mandrel, transfer means for transferring the stripped blank from the reeler, means associated with said transfer means for removing a closed end of the blank, a reheating furnace for reheating the blank, an expanding mill for expanding the blank, and means for sizing the expanded blank.

6. A process of manufacturing expanded metal tubes, comprising providing a blank, subjecting said blank to a push bench operation to thin and elongate the same over a mandrel to generally tubular shape, reeling the blank while on the mandrel to loosen and slightly enlarge the blank, separating the blank from the mandrel, and expanding the blank to enlarged diameter.

CARL W. LITTLER.